United States Patent [19]

Smeltzer et al.

[11] Patent Number: 4,530,723

[45] Date of Patent: Jul. 23, 1985

[54] ENCAPSULATION OF ION EXCHANGE RESINS

[75] Inventors: Eugene E. Smeltzer, Salem Township, Westmoreland County; Michael C. Skriba, Plum Boro, both of Pa.

[73] Assignee: Westinghouse Electric Corp., Pittsburgh, Pa.

[21] Appl. No.: 549,123

[22] Filed: Nov. 4, 1983

Related U.S. Application Data

[63] Continuation-in-part of Ser. No. 472,527, Mar. 7, 1983, abandoned.

[51] Int. Cl.$^3$ ............................................. C04B 7/35
[52] U.S. Cl. ........................................ 106/90; 106/97; 252/628; 252/629
[58] Field of Search ................... 106/90, 97; 252/628, 252/629

[56] References Cited

U.S. PATENT DOCUMENTS

| 4,116,705 | 9/1978 | Chappell | 106/90 |
| 4,122,028 | 10/1978 | Buchwalder et al. | 252/628 |
| 4,249,949 | 2/1981 | Wooler | 252/628 |
| 4,274,880 | 6/1981 | Chappell | 106/90 |

Primary Examiner—James Poer
Attorney, Agent, or Firm—Richard D. Fuerle

[57] ABSTRACT

Disclosed is a method for rapidly forming a solid monolith of an aqueous mixture of an ion exchange resin and boric acid. A fouling agent and sufficient basic accelerator to neutralize the mixture are added. Cement is then added which hardens in a few hours. Also disclosed is a composition of the ion exchange resin, boric acid, water, a fouling agent, a basic accelerator, and cement.

15 Claims, No Drawings

ENCAPSULATION OF ION EXCHANGE RESINS

CROSS REFERENCE TO RELATED APPLICATION

This application is a continuation-in-part of application Ser. No. 472,527, filed Mar. 7, 1983, now abandoned.

BACKGROUND OF THE INVENTION

In pressurized water reactors, ion exchange resins are used to purify the water used in the primary loop of the reactor. After a period of time, the ion exchange resin becomes contaminated with radioactive and other contaminants and must be disposed of. The primary loop of the reactor also contains boric acid which absorbs neutrons, converting their kinetic energy into heat, and the boric acid solution must also be disposed of from time to time for various reasons.

The Nuclear Regulatory Commission (NRC) requires that these low level radioactive wastes be converted into a free-standing monolith for transportation and disposition. It has been the practice in the industry to mix the boric acid solution with the ion exchange resins, to eliminate the need to add clean water to the resins, and then to convert the mixture into a solid monolith by adding cement. However, if the boric acid concentration is less than about 30% by weight a soft, pasty composition is initially produced that must be stored for several months until it solidifies. This greatly adds to the cost of disposing of these waste products.

SUMMARY OF THE INVENTION

We have discovered that ion exchange resins mixed with boric acid or nitrate or sulfate salts can be converted into a solid monolith by the addition of cement in only a few days if a fouling agent and a basic accelerator are first added to the mixture. Our invention utilizes materials which are readily available as waste products in nuclear reactor facilities, and therefore is an inexpensive procedure for accelerating the cement cure time. The method of this invention is safe and easily implemented using equipment already available.

We have also discovered that if the particle size of the ion exchange resin is less than about 200 microns the product is so stable that it can be stored under water.

RELEVANT ART

U.S. Pat. No. 4,249,949 discloses the use of a composition of an organic polyisocyanate, a non-ionic surface active agent devoid of isocyanate-reactive groups, an alkaline filler such as Portland cement, water, and an optional plasticizer for the consolidation of radioactive waste such as spent ion exchange resins or aqueous solutions of borax.

U.S. Pat. No. 4,122,028 discloses a process for the solidification of radioactive boron-containing solutions and suspensions by sequential addition of slaked lime and cement to form solid, transportable blocks.

DETAILED DESCRIPTION OF THE INVENTION

The ion exchange resin slurry that is solidified in the process of this invention is a mixture of a solid ion exchange resin in a solution of boric acid or a nitrate or sulfate salt, such as sodium nitrate or sodium sulfate; it may also contain other contaminants. The mixture is typically treated at the temperature at which the solution leaves the waste evaporator, generally about 160° F. It is preferable to treat the mixture at this temperature as boric acid crystallizes out of solution at lower temperatures, which interferes with the curing of the cement. The mixture is typically about 15 to about 25% (by weight) ion exchange resin, about 1 to about 30% dissolved solids, about 20 to about 25% water, and up to about 1% contaminants. The ion exchange resin is typically a synthetic organic polymer such as styrene, epoxy amine or acrylic. It should have a particle size of less than about 3 mm as larger particle sizes may result in unacceptable rewet stability and lead to excessive swelling of the ion exchange resin and result in fracturing of the cement monolith. Preferably, the ion exchange resin particle size is less than about 200 microns, as this increases the rewet stability of the product to such an extent that it can be stored under water. The contaminants may include radioactive contaminants such as cobalt, cesium, strontium, and radionuclides, as well as non-radioactive contaminants such as iron and corrosion products.

In the process of this invention, a fouling agent and a basic accelerator are added to the ion exchange resin-boric acid mixture. A fouling agent is a compound which can efficiently inhibit chemical exchange by the ion exchange resin. Fouling agents are well known in the art because they are generally to be avoided in operation and include such compounds as motor oil, hydraulic oil, water soluble cutting oils, oily soaps, iron hydroxide, and alum. Motor oil is the preferred fouling agent because of its general availability in power plants as a waste product. About 0.1 to about 0.3% (by weight based on ion exchange resin weight) of the fouling agent should be used.

A basic accelerator is required to neutralize the mixture. The pH should be raised to at least 7 and preferably to greater than 10 for best results. Basic accelerators include alkali metal hydroxides, alkaline earth metal hydroxides, and other compounds which yield hydroxyl groups in solution. The preferred basic accelerator is sodium hydroxide because it is inexpensive and readily available. The amount of basic accelerator required will depend on the acidity of the particular mixture, but generally it is only a few percent.

After the fouling agent and the basic accelerator have been added to the mixture, the cement is added. Almost any type of cement may be used, but Portland cement is preferred as it produces a rapid cure and a strong product. The cement should be added in an amount such that the weight ratio of water to cement is about 0.4 to 1 to about 0.6 to 1. The total mixture, including the cement and water, should be about 40 volume % to about 60 volume % ion exchange resin-boric acid-water mixture and about 40 volume % to about 60 volume % cement. The mixture containing the cement is stirred thoroughly and left to harden or is poured into molds for hardening. Hardening typically requires about 3 to about 5 hours.

The following examples further illustrate this invention.

EXAMPLE

All of the parametric testing with additives was conducted in 16 oz. glass jars using a small motor-driven impeller for mixing. Previous testing showed good correlation, on a relative basis, between the results obtained in the jar tests and the full scale, high shear mixer tests.

When the best mixture was identified in the jar tests, the proportions for a full scale test were calculated, with the addition of simulated pressurized water reactor (PWR) contaminants for leach testing. The table which follows gives the weights or volumes used for the final mixtures.

| Component | For Jar Test | For Full Scale Mixer Test (~68 l) |
| --- | --- | --- |
| Ion Exchange Resin | 125 ml | 27 l |
| Water (from boric acid solution) | 125 ml | 27 l |
| Boric Acid | 17 g | 3.74 Kg |
| Fouling Agent (Motor Oil) | 0.8 g | 172.7 g |
| Type I Portland Cement | 320.5 g | 69.2 Kg |
| 50 wt. % NaOH Solution | 18 g | 3.9 Kg |
| Simulated PWR Contaminants | | |
| Trisodium Phosphate | — | 62 g |
| Motor Oil (simulated non-radioactive contaminants) | — | 62 g |
| $Co(NO_3)_2 \cdot 6H_2O$ | — | 154 g |
| CsCl | — | 40 g |
| $Sr(NO_3)_2$ | — | 75 g |

The full scale test was based on a 1/3 drum volume mix (68 l), but other volumes are also possible on a directly proportional basis. For both tests, the ion exchange resin was added first to the mixing container, and then ~12 weight % boric acid at 160° F. (71.1° C.) was added. The fouling agent was then added, followed by the simulated PWR contaminants for the full scale test (simulating a typical waste stream from the waste holding tank), then the cement and sodium hydroxide were added. A five minute mix time was used after the addition of the last component.

A full scale mixer test of the same composition without the fouling agent or accelerator showed a penetration resistance of only ~25 psi after 60 days. The penetration resistance (ASTM 403-77) of the composition with the fouling agent and the accelerator in the jar test was 5600 psi after ~4 days, and in the full scale test was 2800 psi after ~5 days, an obvious improvement over the previous mixtures.

We claim:

1. A process for encapsulating in cement an ion exchange resin aqueous mixture containing about 1 to about 30% dissolved solids, comprising adding to said mixture:
   (A) about 1 to about 3% of a fouling agent;
   (B) a sufficient amount of a basic accelerator to raise the pH to at least 7; and
   (C) sufficient cement for a water to cement weight ratio of about 0.4 to 1 to about 0.6 to 1.

2. A process according to claim 1 wherein said ion exchange resin has a particle size of up to about 3 mm.

3. A process according to claim 1 wherein said mixture includes radioactive contaminants.

4. A process according to claim 1 which occurs at a temperature of about 160° F.

5. A process according to claim 1 wherein said fouling agent is selected from the group consisting of motor oil, hydraulic oil, water-soluble cutting oil, oily soap, iron hydroxide, alum, and mixtures thereof.

6. A process according to claim 1 wherein said basic accelerator is sodium hydroxide.

7. A process according to claim 1 wherein said cement is portland cement.

8. A process according to claim 1 wherein said pH is raised to at least 10.

9. A cement composition comprising:
   (A) about 15 to about 25% of an ion exchange resin;
   (B) about 1 to about 10% boric acid;
   (C) about 0.1% to about 0.3% of a fouling agent;
   (D) a sufficient amount of a basic accelerator to raise the pH to at least 7;
   (E) sufficient cement for a water to cement weight ratio of about 0.4 to 1 to about 0.6 to 1.

10. A composition according to claim 10 wherein said ion exchange resin has a particle size of up to about 3 mm.

11. A composition according to claim 9, wherein said fouling agent is selected from the group consisting of motor oil, hydraulic oil, water-soluble cutting oil, oily soap, iron hydroxide, alum, and mixtures thereof.

12. A composition according to claim 9, wherein said basic accelerator is sodium hydroxide.

13. A process according to claim 1 wherein said dissolved solids comprise boric acid.

14. A process according to claim 1 wherein the particle size of the ion exchange resin is less than about 200 microns.

15. A composition according to claim 9 wherein the particle size of the ion exchange resin is less than about 200 microns.

* * * * *